(12) United States Patent  (10) Patent No.: US 8,537,359 B2
Stimpson et al.  (45) Date of Patent: Sep. 17, 2013

(54) OBJECT DETECTOR APPARATUS AND METHOD

(75) Inventors: Victor Gordon Stimpson, Avening (GB); William Kenneth Davies, Bristol (GB); Benjamin Jason Merrifield, Bristol (GB); William Martin Barnard, Bridgwater (GB)

(73) Assignee: Renishaw PLC, Wotton-under-Edge (GB)

( * ) Notice: Subject to any disclaimer, the term of this patent is extended or adjusted under 35 U.S.C. 154(b) by 675 days.

(21) Appl. No.: 12/448,128

(22) PCT Filed: Dec. 10, 2007

(86) PCT No.: PCT/GB2007/004707
§ 371 (c)(1),
(2), (4) Date: Jun. 10, 2009

(87) PCT Pub. No.: WO2008/074985
PCT Pub. Date: Jun. 26, 2008

(65) Prior Publication Data
US 2010/0027031 A1  Feb. 4, 2010

(30) Foreign Application Priority Data
Dec. 21, 2006 (GB) .................................. 0625387.6

(51) Int. Cl.
*G01N 21/84* (2006.01)
(52) U.S. Cl.
USPC ........................................................ 356/426
(58) Field of Classification Search
USPC .................. 356/426; 250/559.29, 559.32
See application file for complete search history.

(56) References Cited

U.S. PATENT DOCUMENTS

| 4,148,587 A | 4/1979 | Erdmann et al. |
| 4,340,326 A | 7/1982 | Buonauro et al. |
| 4,502,823 A | 3/1985 | Wronski et al. |
| 4,507,834 A * | 4/1985 | Chen et al. ............... 29/26 R |

(Continued)

FOREIGN PATENT DOCUMENTS

| DE | DD 0153 746 | 1/1982 |
| DE | 3410149 A1 | 10/1985 |

(Continued)

OTHER PUBLICATIONS

Excellon Automation Broken Tool Detector Service Manual, 211012-17, Rev. B, Jun. 1985, pp. 6-1, 6-2 and 7-4.

(Continued)

*Primary Examiner* — Roy M Punnoose
(74) *Attorney, Agent, or Firm* — Oliff & Berridge, PLC (57) ABSTRACT

An object detector apparatus. The object detector apparatus comprises a receiver which is configured to receive a signal from an object having a repetitive motion, in which the signal repeats at a frequency that is dependent on the frequency of the repetitive motion of the object. The object detector apparatus further comprises an analyzer which is configured to sample a signal received by the receiver according to a first set of sampling parameters into a first sampled data set, and to produce an output based on a comparison of the first sampled data set with at least one previously sampled data set. The analyzer is also operable to sample a signal received by the receiver using a second set of sampling parameters which differs to the first set of sampling parameters into a second sampled data set, and to produce an output based on a comparison of the second sampled data set with at least one previously sampled data set.

26 Claims, 7 Drawing Sheets

(56) References Cited

U.S. PATENT DOCUMENTS

| | | | |
|---|---|---|---|
| 4,591,784 A | 5/1986 | Kolitsch et al. | |
| 4,613,812 A | 9/1986 | Gelston, II | |
| 4,654,523 A | 3/1987 | Tanaka et al. | |
| 4,657,395 A | 4/1987 | Shiraishi et al. | |
| 4,667,113 A | 5/1987 | Nakajima et al. | |
| 4,678,337 A | 7/1987 | Cohen et al. | |
| 5,005,978 A * | 4/1991 | Skunes et al. | 356/625 |
| 5,189,625 A | 2/1993 | Le Floch | |
| 5,293,048 A * | 3/1994 | Skunes et al. | 250/559.29 |
| 5,404,021 A * | 4/1995 | Mangano et al. | 250/559.29 |
| 5,636,026 A | 6/1997 | Mian et al. | |
| 5,940,787 A * | 8/1999 | Gelston | 702/134 |
| 6,191,856 B1 * | 2/2001 | Slemon et al. | 356/615 |
| 6,292,261 B1 | 9/2001 | Fishbaine et al. | |
| 6,538,750 B1 | 3/2003 | Fishbaine et al. | |
| 6,635,894 B1 | 10/2003 | Stimpson et al. | |
| 6,731,745 B1 | 5/2004 | Goto | |
| 6,859,266 B2 | 2/2005 | Yamaguchi et al. | |
| 6,878,953 B2 | 4/2005 | Stimpson et al. | |
| 7,053,392 B2 | 5/2006 | Stimpson et al. | |
| 7,174,269 B2 | 2/2007 | Ai et al. | |
| 7,732,797 B2 * | 6/2010 | Stimpson et al. | 250/559.4 |

FOREIGN PATENT DOCUMENTS

| | | |
|---|---|---|
| DE | 3434461 | 3/1986 |
| DE | 3504194 A1 | 6/1986 |
| DE | 239 369 A1 | 9/1986 |
| DE | 3731171 A1 | 3/1989 |
| DE | 3905949 A1 | 8/1990 |
| EP | 0 493 908 A1 | 7/1992 |
| EP | 1 050 368 A1 | 11/2000 |
| EP | 0 851 210 B1 | 6/2003 |
| EP | 1 144 944 B1 | 4/2005 |
| EP | 1 562 020 A1 | 8/2005 |
| GB | 1 510 299 | 5/1978 |
| GB | 2 003 407 A | 3/1979 |
| GB | 2 150 284 | 6/1985 |
| GB | 2 200 747 A | 8/1988 |
| JP | A-53-035568 | 4/1978 |
| JP | A-60-40255 | 4/1985 |
| JP | A-62-124809 | 6/1987 |
| JP | A-63-058203 | 3/1988 |
| JP | A-63-237805 | 4/1988 |
| JP | A-63-163205 | 7/1988 |
| JP | 63233403 A * | 9/1988 |
| JP | A-63-233403 | 9/1988 |
| JP | S63-233403 | 9/1988 |
| JP | A-01-172756 | 7/1989 |
| JP | A-04-204057 | 7/1992 |
| JP | A-06-034647 | 2/1994 |
| JP | A-08-111746 | 4/1996 |
| JP | A-10-185526 | 7/1998 |
| JP | A-2003-215149 | 7/2003 |
| JP | A-2003-270255 | 9/2003 |
| JP | A-2006-502411 | 1/2006 |
| TW | 274584 | 4/1996 |
| TW | 444473 | 7/2001 |
| TW | 200504330 A | 2/2005 |
| WO | WO 01/38822 A1 | 5/2001 |
| WO | WO 03/021197 A1 | 3/2003 |
| WO | WO 2004/056528 A1 | 7/2004 |
| WO | WO 2006/027577 A1 | 3/2006 |

OTHER PUBLICATIONS

Optical Tool Breakage Monitoring Unit with Laser, Leuze press release, Feb. 24, 2003, pp. 1-3.

Leuze Electronic Technical Document and Partial Translation (date unknown, retrieved Jun. 27, 2002).

Broken Drill Detection System (date unknown, retrieved Jun. 27, 2002).

Balluff, online product information, retrieved Nov. 30, 2006.

Office Action issued May 25, 2012 in Japanese Patent Application No. 2009-542188 (with translation).

Translation of May 9, 2013 Office Action issued in Taiwanese Patent Application No. 096149040.

* cited by examiner

OBJECT DETECTOR APPARATUS AND METHOD

BACKGROUND OF THE INVENTION

This invention relates to an object detector apparatus and a method of detecting the presence of an object. In particular, the invention relates to an object detector apparatus for detecting the presence of an object which has repetitive motion, such as a rotating cutting tool.

Objects having a repetitive motion can be detected by a detector device receiving a signal from the object. For instance, the detector device can record the signal as a pattern of data and compares the pattern of data recorded with a previously recorded data pattern. If there is a correlation between the pattern of data recorded and the previously recorded data pattern, then the detector device can determine that an object has been detected. Such a detector device for detecting a rotating cutting tool is described in WO-A-06/027577.

However, with such known detector devices, it is necessary that the motion of the object to be detected repeats at a particular predetermined frequency.

It can be important to be able to detect objects across a range of different frequencies. This is because in some circumstances it might not be possible, or desirable, to cause the object to repeat at one particular predetermined frequency.

Further, even if it is possible to cause the motion of the object to be repeated at the required frequency, the object might normally operate at a different frequency. Accordingly, there will be a delay during the changing of operational frequency of the object so that it can be detected. There will also be a delay in changing the speed of the object back to its normal operating frequency.

SUMMARY OF THE INVENTION

Accordingly, in one aspect, the invention provides an object detector apparatus, comprising: a receiver configured to receive a signal from an object having a repetitive motion, the signal repeating at a frequency that is dependent on the frequency of the repetitive motion of the object; and an analyser configured to sample a signal received by the receiver according to a first set of sampling parameters into a first sampled data set, and to produce an output based on a comparison of the first sampled data set with at least one previously sampled data set; in which the analyser is operable to sample a signal received by the receiver using a second set of sampling parameters which differs to the first set of sampling parameters into a second sampled data set, and to produce an output based on a comparison of the second sampled data set with at least one previously sampled data set.

Being able to sample a signal received by the receiver using at least two different sampling parameters enables the object detector apparatus to be able to detect objects moving in a repetitive manner at least two different frequencies of motion. For instance, if the object is a rotating object, then the invention allows the object detector apparatus to detect rotating objects at least two different rotational speeds. Accordingly, the present invention can be used with a wider range of frequencies of repetitive motion than current object detector apparatus. Furthermore, if the frequency of the repetitive motion of the object needs to be changed in order to be detected, the delay in changing the frequency can be less than with an object detector apparatus which is able to detect objects moving repetitively at one particular frequency.

The repetitive motion could be rotational motion. For instance, the object detector apparatus could be configured to receive a signal from a rotating object, wherein the signal repeats at a frequency that is dependent on the rotational speed of the object. The repetitive motion could be reciprocating motion. For instance, the object detector apparatus could be configured to receive a signal from an object that oscillates, wherein the signal repeats at a frequency that is dependent on the frequency of oscillation. The object could oscillate in a linear dimension. The object could oscillate about an axis. Alternatively the object could oscillate along an axis.

The data in the at least one previously sampled data set can be historical data. As will be understood, historical data can be data recorded and stored prior to the operation of the object detector apparatus. In this case, the at least one previously sampled data set can contain data which is representative of the object moving in a repetitive motion at a predetermined frequency. This enables the object to be detected quickly because only one sampled data set need be recorded during operation of the object detector apparatus in order to detect the object.

Preferably, the data in the at least one previously sampled data set is sampled data of the signal received by the receiver substantially immediately prior to the sampling of the signal in the sampled data set. Accordingly, at least two sampled data sets need be recorded during the operation of the object detector apparatus in order to detect an object; that is the at least one previously sampled data set need be recorded, and then the first (or second) data set need be recorded. This is advantageous because the object detector apparatus need not have the capability to store historical data. Furthermore, it is not necessary for the object detector apparatus to know the pattern of data which the object will create before operation.

The at least one previously sampled data set which the first sampled data set is compared with can be the same as the at least one previously sampled data set which the second sampled data set is compared with. For instance, when the at least one previously sampled data set is historical data, then the first and second sampled data sets can both be compared with the same historical data to see if either of them match the historical data.

Preferably, the at least one previously sampled data set which the first sampled data set is compared with is different to the at least one previously sampled data set which the second sampled data set is compared with. In particular, preferably the sampling parameters used to sample the data into the at least one previously sampled data set is the same as the sampling parameters used to sample the signal into the sampled data set that is to be compared with the previously sampled data set. Accordingly, preferably, the first data set is compared with at least one first previously sampled data set, and the second data set is compared with at least one second previously sampled data set which differs to the at least one first previously sampled data set.

The signal sampled into the first sampled data set and the signal sampled into the second sampled data set can be the same signal. For instance, the signal sampled into the first sampled data set can be received from the same object as the signal sampled into the second sampled data set.

Further, the signal sampled into the first sampled data set can be the same signal, taken over the same period of time, as the signal sampled into the second data set. Accordingly, the analyser can be configured to sample the signal received by the receiver into the first sampled data set and to sample the signal into the second sampled data set. The sampling of the signal into the first and second data sets can be done substantially concurrently. The analyser can therefore analyse the signal received from the object using two different sets of sampling parameters in parallel.

The analyser could be coupled to the receiver. The analyser and receiver could be provided as a single unit. Optionally, the analyser could be provided as a separate unit to the receiver and be in communication with the receiver.

The analyser could comprise analogue signal processing circuitry. Optionally, the analyser could comprise digital signal processing circuitry. As will be understood, the analyser could comprise both analogue and digital signal processing circuitry.

The analyser could be hardwired. Optionally, the analyser could comprise programmable logic, such as programmable logic arrays (PLAs), programmed gate arrays (PGAs) such as field-programmable gate arrays (FPGAs), programmable array logic (PAL) and uncommitted logic arrays (ULAs). At least part of the analyser could be implemented via software running on electronic circuitry, for instance a processor. Suitable processors include microprocessors such as a digital signal processor (DSP), and microcontrollers such as programmable intelligent computer (PIC) microcontrollers.

The analyser could comprise a sampler for sampling a signal received by the receiver. The analyser could comprise a comparator for comparing the sampled data sets with the at least one previously sampled data sets. The analyser could comprise separate samplers for the sampling of the first and at least second sampled data sets. The analyser could comprise separate comparators for the comparison of the first and at least second sampled data sets. Optionally, the same sampler and comparator can be used to sample and compare each of the sampled data sets. As will be understood, the sampler and the comparator can be analogue or digital circuitry or a combination thereof, or indeed any of the types of circuitry previously mentioned. In particular, the sampler and the comparator can be provided by a processor configured to sample and compare the sampled data sets.

The analyser can comprise first circuitry configured to sample the signal into the first sampled data set, and second circuitry configured to operate in parallel with the first circuitry, to sample the signal into the second sampled data set. Separate circuitry, each which samples the signal according to its sampling parameters can operate more efficiently than a single circuit which alternates between sampling a signal using different sampling parameters to produce the first and second sampled data sets. As will be understood, the first and second circuitry can be analogue or digital circuitry or a combination thereof, or indeed any of the types of circuitry previously mentioned. Preferably, the first circuitry is a first processor and the second circuitry is a second processor.

Preferably, the first circuitry is configured to compare the first sampled data set with the at least one previously sampled data set and to produce an output based on the comparison. Preferably, the second circuitry is configured to compare the second sampled data set with the at least one previously sampled data set and to produce an output based on the comparison. Using different circuitry for the comparison is much more efficient than having a single circuit which alternates between comparing the first and second data sets to the at least one previously sampled data sets.

Preferably, the analyser is operable to sample a signal received by the receiver using at least a third set of sampling parameters which differ to the first and second sampling parameters into at least a third sampled data set, and to produce an output based on a comparison of the at least third sampled data set with at least one previously sampled data set. The more sets of sampling parameters the analyser can use, the higher the number of objects having different frequencies of repetitive motion which can be detected.

More preferably, the analyser comprises at least third circuitry which is configured to sample the signal into the third data set. Preferably, the third circuitry is configured to compare the third sampled data set with the at least one previously sampled data set and to produce an output based on the comparison.

Preferably, the analyser is configured to output an object detected signal when any one or all of the comparisons of the first and second data sets with their respective previously sampled data sets result in an output signal indicative of an object being detected. Accordingly, an object detected signal is output so long as one of the sampling parameters is suitable for detecting an object moving at the frequency of repetitive motion of the object. More preferably, the analyser comprises an OR gate which ORs the outputs from the first and second circuitry.

The signal sampled into the second sampled data set can be a different signal to the signal that is sampled into the first data set. In particular, the signal sampled into the second sampled data set can be a signal received by the receiver subsequent to the signal that is sampled into the first data set. The signal sampled into the second sampled data set and the signal that is sampled into the first data set can be from the same object.

This is advantageous because it enables the object detector apparatus to be configured to firstly detect an object moving with a first frequency, and then subsequently be configured to detect an object moving with a different second frequency. The object having the second frequency could be the same object as the object moving at the first frequency or could be a different object. It is possible therefore to detect the same or different object operating at different frequency using only a single circuit sampling and processing one signal at a time.

The analyser can comprise circuitry which is configured to sample the signal into the first sampled data set and to subsequently sample the signal into the second sampled data set.

The analyser could cycle through different predetermined sets of sampling parameters sequentially. The analyser could cycle through different predetermined sets of sampling parameters until an output indicative of the detection of an object is produced by the analyser. For instance, the analyser could be configured to sample the signal received by the receiver using the second set of sampling parameters only if the comparison of the first sampled data set with at least one previously sampled data set does not result in the detection of the object. This enables the automatic detection of an object moving at one of a plurality possible frequencies, without the need for parallel processing.

The object detector apparatus can comprise an input mechanism by which at least one of the first and second set of sampling parameters can be set. This can be advantageous because the sampling parameters do not need to be determined prior to operation of the object detector apparatus. Furthermore, this enables the sampling parameters to be changed during operation of the object detector apparatus.

The input mechanism can comprise a user input device by which a user can manually enter the at least one of the first and second set of sampling parameters.

Preferably, the input mechanism comprises a feedback device which is operable to determine the frequency of the repetitive motion of the object. Preferably, at least one of the input mechanism and the analyser is configured to determine at least one of the first and the second set of sampling parameters based on the determined frequency of the repetitive motion of the object. This is advantageous because the analyser can automatically adopt the correct sampling parameters required to successfully detect an object moving at the frequency of the motion of the object.

The feedback mechanism could be configured to receive a signal from a machine driving the object, which indicates the frequency of the motion of the object.

Optionally, the feedback mechanism could be configured to detect the frequency of the motion of the object. The feedback mechanism could be configured to determine the frequency of a marker signal received by the receiver. The marker signal could be created by a marker on either the object or on a part of a machine which causes the object to be moved in the repetitive manner. The feedback mechanism could be configured to calculate the frequency of the repetitive motion from the determined frequency of the marker signal. Preferably, the marker signal is an optical signal. As will be understood, any predetermined number of markers could be provided. Preferably, the marker is configured to provide one marker signal per cycle of repetitive motion of the object (e.g. one marker signal per revolution or oscillation).

Preferably, the analyser comprises the feedback mechanism. Preferably, the receiver is configured to receive the marker signal. More preferably, the analyser is configured to selectively operate in an object detect mode in which the analyser analyses the signal received by the receiver to determine the presence of an object, and in a feedback mode in which the analyser analyses the signal received by the receiver to determine the frequency of the motion an object.

The marker signal could be created by a passive marker feature. For example, the marker feature could reflect an optical signal. The optical signal can be any signal in the infrared to ultraviolet range. Preferably, the optical signal is a visible signal. The optical signal could be reflected ambient light. Optionally, the object detector apparatus could comprise an optical signal source which transmits the optical to be reflected. The marker signal could be created by an active marker feature. For example, the marker feature could transmit light. For example, the marker feature could be an LED.

The sampled data set can comprise a plurality of data entries, each of which represents a property of the signal received by the receiver at a particular instant in time. Preferably, the property is the intensity of the signal received by the receiver. Preferably, each sample of a signal corresponds to one data entry in the sampled data set.

Preferably, the sampling parameters comprise a sampling rate. Accordingly, preferably the signal sampled into the first data set is sampled at a rate that is different the rate at which the signal is sampled into the second data set. Preferably, the sampling rate is the number of samples taken over a given period of time.

When the object is rotating, preferably, the sampling rate for detecting an object having a given rotational speed is such that a whole number of samples is taken for one rotation of the object. Preferably, the sampling rate for detecting an object having a given rotational speed is such that not more than thirty-six samples are taken for each rotation of the object, more preferably not more than twenty-four, especially preferably not more than twelve. The sampling rate for detecting an object having a given rotational speed for an object is such that not less than six samples are taken for each rotation of the object.

The sampling parameters can comprise the number of data entries in a sampled data set. Preferably, there are not more than thirty-six data entries in a sampled data set, more preferably not more than twenty-four data entries in a sampled data set, especially preferably not more than twelve data entries in a sampled data set. Preferably, there are not less than six data entries in a sampled data set, especially preferably not less than 10 data entries in a sampled data set. Most preferably there are twelve data entries in a sampled data set.

The sampling parameters can comprise the number of previously sampled data sets the first and second sampled data sets are compared with. The greater then number of correlations required, the greater the reliability of the analyser, but the longer it takes to obtain an output from the analyser.

The optimum number of previously sampled data sets the sampled data is compared with can depend on the frequency of the repetitive motion of the object. The higher the frequency, then the greater the number of previously sampled data sets that can be recorded in a given time period.

The optimum number of the previously sampled data sets the sampled data is compared with can depend on the operating environment of the object detector apparatus. The dirtier the operating environment, then the more data sets that can be required to avoid an accidental detection of an object.

Preferably, the sampled data sets are compared with at least two previously sampled data sets. In some circumstances, preferably the sampled data sets are compared with at least three previously sampled data sets, more preferably at least four previously sampled data sets. Preferably, the sampled data sets are compared with not more than eight previously sampled data sets, more preferably not more than six previously sampled data sets, especially preferably not more than five previously sampled data sets.

Preferably, the analyser can operate in either a clean environment mode and a dirty environment mode. Preferably, the number of previously sampled data sets the sampled data is compared with in the dirty environment mode is twice that in the clean environment mode.

The sampling parameters can comprise whether the analyser is to operate in clean environment mode or dirty environment mode. The operator might want to set the analyser to operate in the dirty environment mode when there is an increased likelihood of dirt, such as swarf or liquid, in the vicinity of the object. For instance, this might be the case when the object is sprayed with coolant.

Preferably, the sampled data sets comprise binary data. Each data entry in a sampled data set can comprise any number of bits. Optionally, more than one bit of data can be stored in each data entry. In such instances it will be possible to record the intensity of the signal at the receiver. Preferably, each data entry in a sampled data set comprises only one bit of data. Accordingly, each section of data can have only one of two values. This is simpler to compare than having to compare more than two possible values.

Preferably, each data entry in a sampled data set represents one sample taken by the analyser. Preferably sampled data is added to the first and second data sets in a scrolling manner. Preferably, the analyser is configured to add sampled data to one end of the sampled data set. Preferably, when the sampled data set is full, the analyser is configured to remove the oldest sampled data from the sampled data set every time new sampled data is added. Preferably, the first and second sampled data sets adhere to a first-in-first-out policy.

Preferably, the oldest sampled data removed from the sampled data set is moved into the at least one previously sampled data set. Accordingly, preferably, the previously sampled data sets are filled with data that has been removed from their respective first and second sampled data sets.

The first and second sampled data sets can be compared with their previously sampled data sets once every "X" number of samples are taken, wherein "X" represents the number of data entries in the sampled data set. In this case, the comparison takes place every time the data in the sampled data set has been completely replaced with new data.

The first and second sampled data sets can be compared with their respective at least one previously sampled data sets more frequently. Preferably, the first and second sampled data sets are compared with their respective at least one previously sampled data sets at least once every time "X−1" number of samples are taken (wherein "X" represents the number of data entries in the sampled data set).

More preferably, the first and second sampled data sets are compared with their respective at least one previously sampled data set every time a new sample is added to their sampled data set. Accordingly, the rate of comparison of the first and second data sets with their respective at least one previously sampled data sets can be the same as the sampling rate.

This enables quicker elimination of erroneous bits in the first and second sampled data sets, and/or in their respective at least one previously sampled data sets. Erroneous bits can be bits which inaccurately indicate the detection of a feature of an object. Such erroneous bits can be caused by, for example, inaccuracies in the electronics, or due to the detection of dirt which looks like a feature of an object.

Preferably, the receiver is configured to receive electromagnetic radiation (EMR).

Accordingly, preferably the receiver comprises an EMR receiver. Preferably, the receiver is configured to receive an optical signal from an object. Accordingly, preferably the receiver comprises an optical receiver. The optical signal can be any signal in the infrared to ultraviolet range. Preferably, the optical signal is a visible signal. The optical signal could be reflected ambient light. As will be understood, suitable optical receivers include photodiodes, phototransistors, image sensors, charge-coupled devices (CCDs), and complementary metal oxide semiconductor (CMOS) detectors.

Preferably, the object detector apparatus comprises a transmitter configured to transmit a signal. In this case the signal received by the receiver is preferably at least a partial reflection of the transmitted signal. As will be understood, it might be that not all of the signal reflected by the object is detected by the receiver; some of the signal might be scattered such that it is not detectable by the receiver. Preferably, the transmitter is configured to transmit an optical signal. More preferably, the transmitter is configured to transmit a laser beam. As will be understood, suitable optical transmitters include various light sources such as Light Emitting Diodes (LEDs) and laser diodes.

The transmitter and receiver can be in separate units which are independently manipulable. Preferably, the transmitter and receiver are in a single unit.

The receiver can be configured to determine the intensity of the optical signal reflected from the object. Preferably, the transmitter is configured to control the intensity of the optical signal emitted from the transmitter in response to the determined intensity of optical signal reflected from the object. Preferably, the transmitter is configured to reduce the intensity of the optical signal emitted from the transmitter when the determined intensity of light reflected from the object is above a predetermined threshold. Preferably, the transmitter is configured to increase the intensity of the optical signal emitted from the transmitter when the determined intensity of light reflected from the object is below a predetermined threshold.

The object can be a cutting tool. For instance, the object can be a drill bit.

Preferably, the analyser is configured not to output a signal indicative of an object being detected when the data entries of a sampled data set all have the same value.

According to a second aspect of the invention, there is provided an object detector apparatus, comprising: a receiver configured to receive a signal from an object having a repetitive motion, the signal repeating at a frequency that is dependent on the frequency of the repetitive motion of the object; and an analyser being configured to sample the signal according to a first set of sampling parameters into a first sampled data set, and to produce a first output signal based on a comparison of the first sampled data set with at least one previously sampled data set, and to concurrently sample the signal using a second set of sampling parameters which differs to the first set of sampling parameters into a second sampled data set, and to produce a second output signal based on a comparison of the second sampled data set with at least one previously sampled data set.

According to a third aspect of the invention, there is provided an object detector apparatus, comprising: a receiver configured to receive a signal from an object having a repetitive motion, the signal-repeating at a frequency that is dependent on the frequency of the repetitive motion of the object; and an analyser being configured to sample a first signal received by the receiver according to a first set of sampling parameters and to produce a first output signal based on a comparison of the first sampled data set with at least one previously sampled data set, and the analyser being configurable to subsequently sample a second signal received by the receiver subsequent to the first signal according to a second set of sampling parameters which differ to the first set of sampling parameters, and to produce an second output signal based on a comparison of the second sampled data set with at least one previously sampled data set.

According to a fourth aspect of the invention there is provided an object detector apparatus, comprising: a receiver configured to receive a signal from an object having a repetitive motion, the signal repeating at a frequency that is dependent on the frequency of the repetitive motion of the object; an analyser being configured to sample the signal according to a first set of sampling parameters into a first sampled data set, and to produce a first output signal based on a comparison of the first sampled data set with at least one previously sampled data set; and an input mechanism by which the first set of sampling parameters can be input to the analyser.

Optionally, the input mechanism can be configured to allow a user to manually enter the first set of sampling parameters.

Optionally, the input mechanism can be configured to allow a user to manually enter the frequency of the repetitive motion of the object. In this case, at least one of the input mechanism and analyser can be configured to determine and to set the first set of sampling parameters based on the frequency of the repetitive motion of the object input by the user.

Preferably, the input mechanism comprises a feedback mechanism which is operable to determine the frequency of the repetitive motion of the object. At least one of the input mechanism and the analyser can be configured to determine and to set the first set of sampling parameters based on the determined frequency of the repetitive motion of the object.

The feedback mechanism can be configured to receive a signal from a machine driving the object which indicates the frequency of the repetitive motion of the object. The feedback device could be configured to continually receive such a signal and to continually calculate the first set of sampling parameters in line with the changes in the frequency of the repetitive motion of the object.

The feedback mechanism could be configured to detect the frequency of the repetitive motion of the object. The feedback mechanism could determine the frequency of a marker signal received by the receiver. The marker signal could be created by a marker on either the object or a part of a machine which causes the object to be moved in the repetitive manner. The feedback mechanism could then calculate the frequency of the repetitive motion from the determined frequency of the marker signal.

Preferably, the analyser comprises the feedback mechanism. Preferably, the receiver is configured to receive the marker signal. More preferably, the analyser is configured to selectively operate in an object detect mode in which the analyser analyses the signal received by the receiver to determine the presence of an object, and in a feedback mode in which the analyser analyses the signal received by the receiver to determine the frequency of the motion an object. Preferably, the object detector apparatus comprises a mode selector which enables the analyser to selectively switch between the object detect and feedback modes. Preferably the mode selector is operable by the user. This could be for instance via a switch on the object detector apparatus, or for example via a computer program input.

Preferably the marker signal is an optical signal. The marker signal could be created by a passive marker feature. For example, the marker feature could reflect an optical signal. The optical signal can be any signal in the infrared to ultraviolet range. Preferably, the optical signal is a visible signal. The optical signal could be reflected ambient light. Optionally, the object detector apparatus could comprise an optical signal source which transmits the optical to be reflected. The marker signal could be created by an active marker feature. For example, the marker feature could transmit light. For example, the marker feature could be an LED.

Preferably, the input mechanism is configured to determine the first set of sampling parameters based on the determined frequency of the repetitive motion of the object.

According to a fifth aspect of the invention there is provided a machine tool apparatus incorporating an object detector apparatus as described above.

According to a sixth aspect of the invention, there is provided a method of detecting the presence of an object, comprising: (i) receiving a signal from an object having a repetitive motion, the signal repeating at a frequency that is dependent on the frequency of the repetitive motion of the object; (ii) sampling the signal received according to a first set of sampling parameters into a first sampled data set, and producing an output signal based on a comparison of the first sampled data set with a first previously sampled data set; and (iii) sampling the signal received according to a second set of sampling parameters which differ to the first set of sampling parameters into a second sampled data set, and producing an output signal based on a comparison of the second sampled data set with a second previously sampled data set.

As will be understood, the method of the invention could be configured to operate in accordance with the above described embodiments. For instance, the signal sampled into the second sampled data set can be a signal received by the receiver subsequent to the signal that is sampled into the first data set. Preferably, the signal sampled into the first sampled data set can be the same signal as the signal sampled into the second sampled data set. The sampling of the received signal according to the second set of sampling parameters can occur substantially concurrently with the sampling of the received signal according to the first set of sampling parameters.

The method can comprise subsequent to (i) and prior to (ii), inputting the second set of sampling parameters and reconfiguring the analyser to use the second set of sampling parameters.

The method can comprise determining the frequency of the repetitive motion of the object. In this case, the method can further comprise determining at least one of the first and the second set of sampling parameters based on the determined frequency of the repetitive motion of the object.

The method can comprise receiving a signal from a machine driving the object, which indicates the frequency of the motion of the object. Optionally, the method can comprise detecting the frequency of the motion of the object. The method can comprise determining the frequency of a marker signal received by the receiver. The marker signal could be created by a marker on either the object or on a part of a machine which causes the object to be moved in the repetitive manner. The method could further comprise calculating the frequency of the repetitive motion from the determined frequency of the marker signal.

BRIEF DESCRIPTION OF THE DRAWINGS

An embodiment of the invention will now be described, by way of example only, with reference to the following drawings, in which:

FIGS. 5a, b, c, d, e, f and g show diagrammatic representations of the circuitry shown in FIG. 4;

DETAILED DESCRIPTION OF THE EMBODIMENTS

Figure 1:
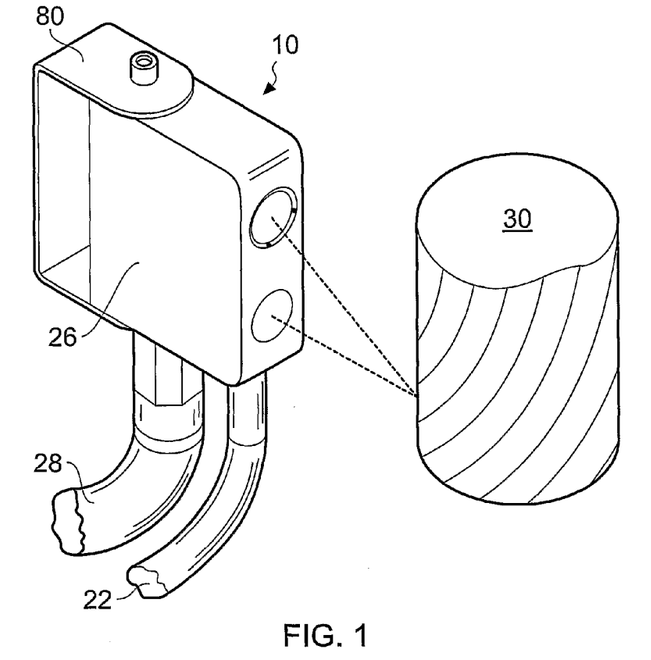
FIG. 1 shows an object detector apparatus according to the invention in use as a cutting tool detector.

Referring now to the drawings, FIG. 1 shows an object detector apparatus 10 according to the present invention, a mounting bracket 80 for fixing the device to a machine or the like (not shown), and a portion of a tool 30 which is to be detected by the object detector apparatus 10.

Figure 2:
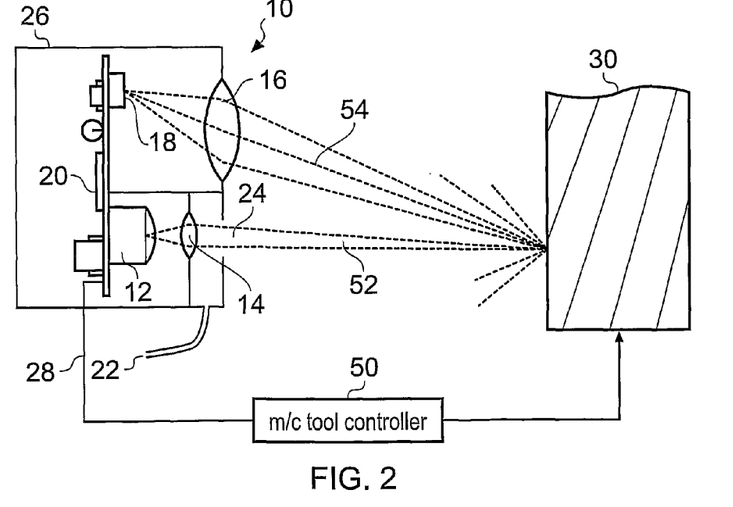
FIG. 2 shows a schematic diagram of the inside of the object detector apparatus shown in FIG. 1.

As shown in FIG. 2, the object detector apparatus 10 comprises a housing 26 which contains a laser diode light transmitter ("laser") 12, a transmitter focusing lens 14, a receiver lens 16, a photodiode light receiver ("photodiode") 18 and analyser circuitry 20. The object detector apparatus 10 is electrically coupled to a machine tool controller 50 via output line 28. The machine tool controller 50 controls the operation of the machine tool which controls the operation of the tool 30.

In use, light transmitted by the laser 12 is focussed approximately at the point where the tool 30 is expected along output light path 52. When a tool 30 is present, at least a part of the transmitted light is reflected along reflected light path 54. Reflected light 54 is then focussed by receiver lens 16 onto the photodiode 18.

In the machining environment, particles of debris can obscure the light paths 52, 54 and the lenses 14, 16. To alleviate this, the object detector apparatus 10 is provided with an air supply 22 at the transmitter focusing lens 14. The air supply 22 provides a continuous flow of air so that air continually flows from within the housing 26 through an aperture 24 into the machining environment. This continuous positive pressure helps to prevent debris from entering the housing 26, and from sticking to parts of the housing which would interfere with the transmission of the transmitted laser by the laser photo diode light transmitter 12 along light path 52.

To further alleviate the problem of debris, the receiver lens 16 is approximately twice as large as required. Accordingly, up to half of the surface of the receiver lens 16 can be covered by particles or an oil film and the still be sufficient surface area remaining to enable the signal to be adequately received. Thus the system has built in redundancy so that the reflected signal can deviate from the optimal reflected light path 54 and still be received.

In the embodiment described the detector device 10 includes analyser circuitry 20 for detecting the presence of an object. The analyser circuitry 20 is mounted within the housing. As will be understood, the analyser circuitry 20 could be located outside the housing 24, remote to the working environment. Signals indicative of the intensity of light received at the photodiode light receiver 18 are passed to the analyser circuitry 20 which determines whether or not the signals are indicative of the presence of an object. When the analyser circuitry 20 determines that the signals are indicative of an object being present, then it outputs an object detected signal along output line 28 to machine tool controller 50. The analyser circuitry 20 and its operation will be described in more detail below in connection with FIG. 4.

Figure 3A:
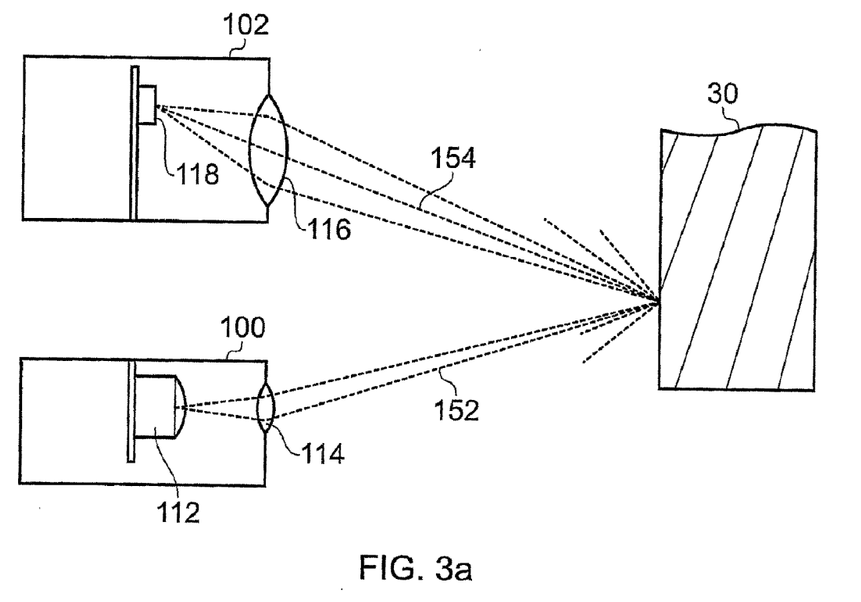
FIGS. 3a and b show alternative configurations of an object detector apparatus according to the invention.
Figure 3B:
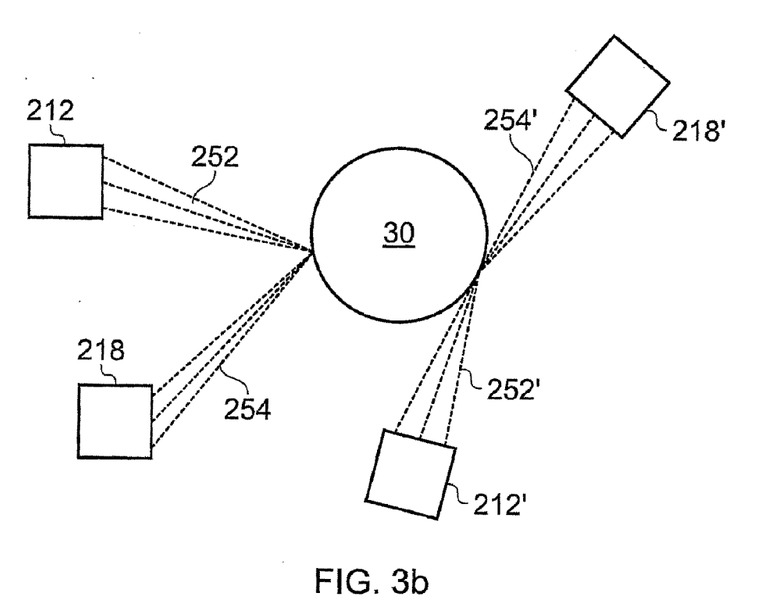

FIGS. 3a and 3b show alternative embodiments of an object detector apparatus according to the present invention. In FIGS. 3a and 3b the object detector apparatus(s) 102, 218, 218' are provided as separate devices to the transmitter devices 100, 212, 212'. A laser diode light transmitter 112, transmitter focusing lens 114, receiver lens 116 and a photodiode light receiver 118 are shown in FIG. 3a.

As shown in FIG. 3a, the transmitter device 100 and object detector apparatus 102 are displaced vertically from each other.

In FIG. 3b, two sets of transmitter devices and object detector apparatuss are provided. In each set the transmitter/detector pair lie substantially in the same vertical plane, but they are radially displaced about the rotating axis of the tool 30. In one case the angle of displacement between the transmitter 212 and the detector 218 is less than 90°. In the other case the angle of displacement between the transmitter 212' and the detector 218' is between 90° and 180°.

Figure 4:
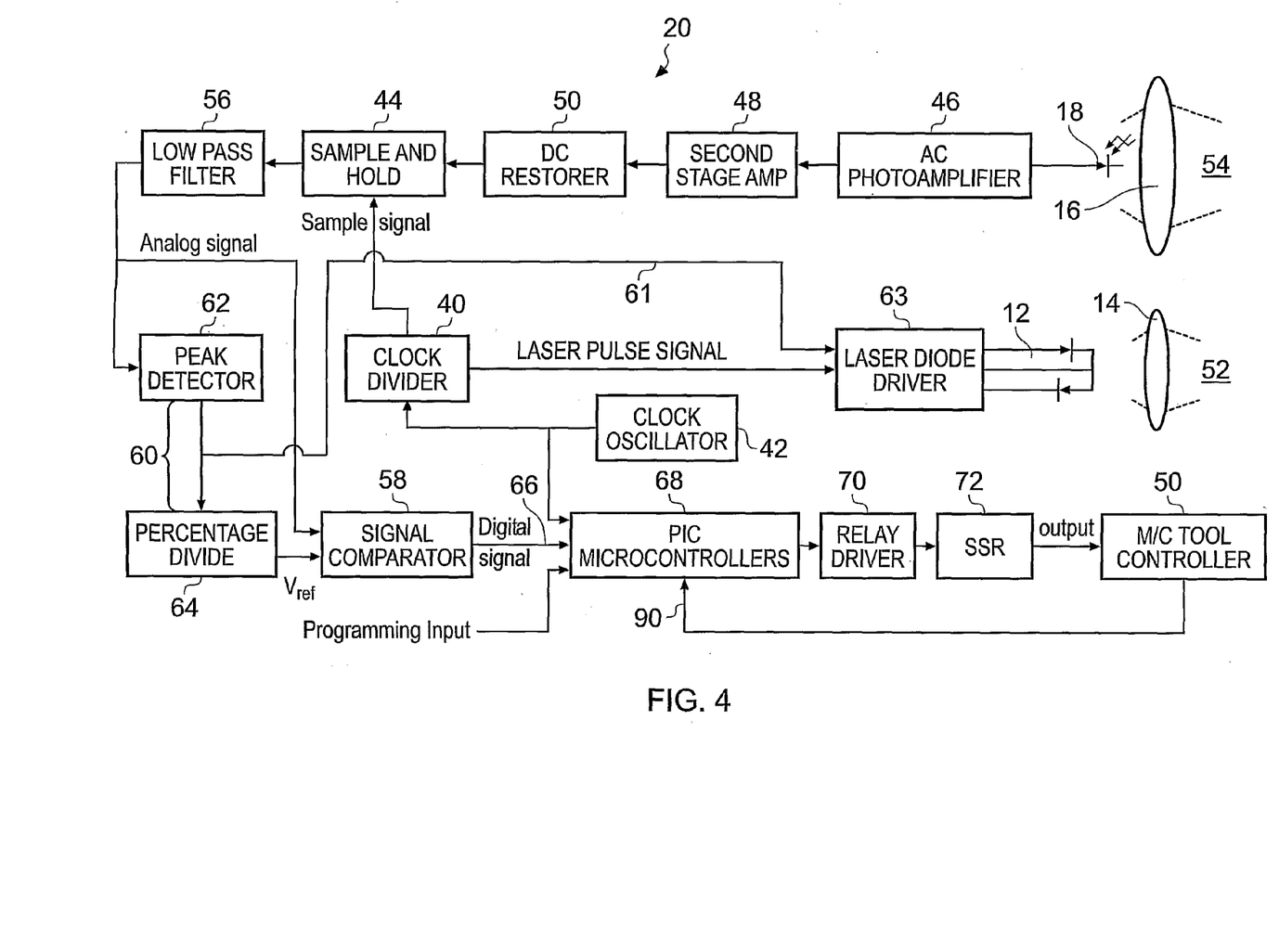
FIG. 4 shows a block circuit diagram of circuitry for use in the object detector apparatus shown in FIGS. 1 and 2.

Referring to FIG. 4, the analyser circuitry comprises a clock oscillator 42 and a divider circuit 40. The divider 40 produces two synchronised outputs. The first output is a signal to trigger the laser 12, under the control of the laser diode driver 63, and the second output is a signal to a sample and hold circuit 44. The signal from the divider circuit operates at about 125 kHz. At this frequency the laser 12 is constantly flashing on and off at a rate which, to a machine operator or observer appears as a weak laser output. Thus the average light output 52 of the laser 12 will be below currently acceptable limits for unprotected viewing of the laser. Consequently the output 52 from the laser 12 is safe for the operator.

Reflected light 54 returning to the lens 16 and ambient light is detected by the photodiode 18 and its analogue signal is amplified in a two-stage amplifier 46/48. A DC restorer 50 holds the alternating signal about a suitable voltage to stop it wandering due to changes e.g. in ambient light levels. The sample and hold circuit 44 is triggered at approximately the same time as the laser 12 by the synchronised signal from the clock divider circuit 40. The signal produced by the amplifier 46/48 will represent one flash of the laser light 52.

Figures 5A, 5B:
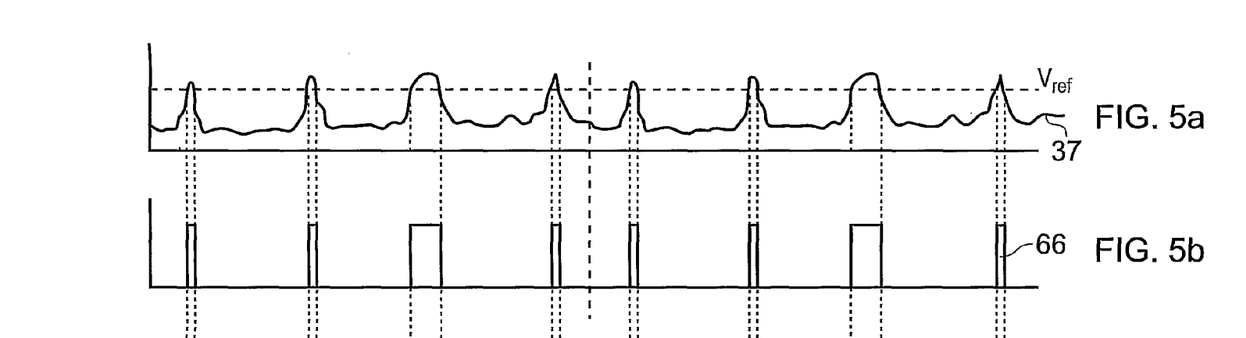

A signal 37 from the sample and hold circuit is so frequent (125 kHz) that it appears continuous as shown in FIG. 5a although in practice one sample is taken approximately every 8 μSec.

The signal from the sample and hold circuit 44 is then filtered in a low pass filter 56 to remove unwanted high frequency noise. The periodic analogue signal from the filter is then split and fed to a signal comparator 58 and reference voltage producing circuitry 60 comprising a peak signal strength detector 62 and a percentage dividing circuit 64.

The output (Vref) from the reference voltage circuit 60 is thus a percentage of the peak analogue signal strength from the low pass filter 56. This reference voltage Vref is compared with the analogue signal 37 and the comparator 58 produces an output only when the analogue signal exceeds the reference voltage.

This will happen only when the amount of light at the photodetector is abnormally high i.e. when the laser light 54 is reflected onto the photodiode 18. The output 66 from the comparator 58 is shown in FIG. 5b.

If the tool 30 is rotating and has teeth or other irregularities then the amount of light detected by the photodetector will peak regularly as the teeth or other irregularities move into the pulses of light 52 and cause reflections 54 which are detected by the photodiode 18. The pulses occur so frequently that rotating teeth etc are not missed by the detection analyser circuitry 20.

The output from the comparator 58 is fed into a PIC microcontroller unit 68. The PIC microcontroller unit 68 is initially setup via a programming input line 91 and has an input from the clock oscillator 42 to keep it synchronous with the sampling rate. The PIC microcontroller unit 68 analyses the digital signals 66 received from the signal comparator 58 and produces an output signal which indicates whether or not the signals from the signal comparator 58 are indicative a tool 30 being detected. The output signal from the PIC microcontroller unit 68 is fed through a Relay Driver 70 and a solid state relay (SSR) 72 to the machine tool controller 50 via what is known as a skip line comprising a simple 24 volt on/off signal. This signal is then used by the machine tool controller 50 to control the operation of the tool 30.

The PIC microcontroller unit 68 has a sampling parameter input line 90 by which different sampling parameters can be input to the PIC microcontroller unit 68 as described in more detail below.

The strength of the signal 37 is dependent on the intensity of the light signal received at the photodiode 18. If the intensity of light received at the photodiode 18 is too high or too low, then it can be difficult to detect peaks in the signal received. The intensity of the light received at the photodiode 18 can depend on a number of different factors, such as the output power of the laser 12, the distance between the object and the photodiode 18, and the how reflective the object is.

Line 61 carries a signal indicative of the peak signal strength from the peak signal strength detector 62 to the laser diode driver 63 which drives the operation of the laser 12. The laser diode driver 63 compares the signal received from line 61 to preferred upper and lower threshold limits. If the signal received from line 61 is above the upper threshold limit or below the lower threshold limit, then the laser diode driver 63 adjusts the output power of the laser 12 so that the peak signal strength falls within the upper and lower threshold limits. In the embodiment described, the output power of the laser 12 is controlled by the laser diode driver such that the peak signal strength is as close to 4 volts as possible. Accordingly, in this case the upper and lower threshold limits are 4.01 volts and 3.99 volts respectively.

The operation of the PIC microcontroller unit 68 will now be described in more detail with reference to FIGS. 5a to 5e.

The PIC microcontroller unit 68 can comprise either one PIC microcontroller, or can comprise a plurality of PIC microcontrollers which can operate in parallel. The operation of the PIC microcontroller unit 68 will first be described in relation to the embodiment in which the PIC microcontroller unit 68 comprises a plurality of PIC microcontrollers, and in which the tool 30 to be detected is rotating at 200 rpm.

The PIC microcontroller unit 68 receives the signal from the signal comparator 58, and provides the signal to each PIC microcontroller. Each PIC microcontroller is setup to sample the signal from the signal comparator 58 using different sampling criteria in order to be able to detect tools rotating at different rotational speeds. In the embodiment described, a first PIC microcontroller is setup to detect a tool rotating at 200 rpm, and a second PIC microcontroller is setup to detect a tool rotating at 300 rpm. Furthermore, both the first and second PIC microcontrollers are setup to obtain twelve samples over one rotation of a tool which is rotating at the rotational speed they are set up for.

Twelve samples per revolution is preferred because the number of teeth of the cutter is likely to be a factor of twelve. If so, teeth detection signals will occur in the middle of the sample time not at the periphery of the sample time. Consequently, there is a reduced risk of a tooth detection signal floating from one sample position to an adjacent sample position during the three or more revolutions of the detection, and hence less chance of a tool being undetected due to the lack of correlating data.

Accordingly, the sampling period of the first PIC microcontroller will be approximately 25 mS and the sampling period of the second PIC microcontroller will be approximately 16.6 mS.

If a signal from the signal comparator 58 is received by the first PIC microcontroller from the signal comparator during its sampling period, then the first PIC microcontroller records this event as a binary "1" in its register, otherwise a binary "0" is recorded. Likewise, if a signal from the signal comparator 58 is received by the second PIC microcontroller from the signal comparator during its sampling period, then the second PIC microcontroller records this event as a binary "1" in its register, otherwise a binary "0" is recorded.

Figure 5C:
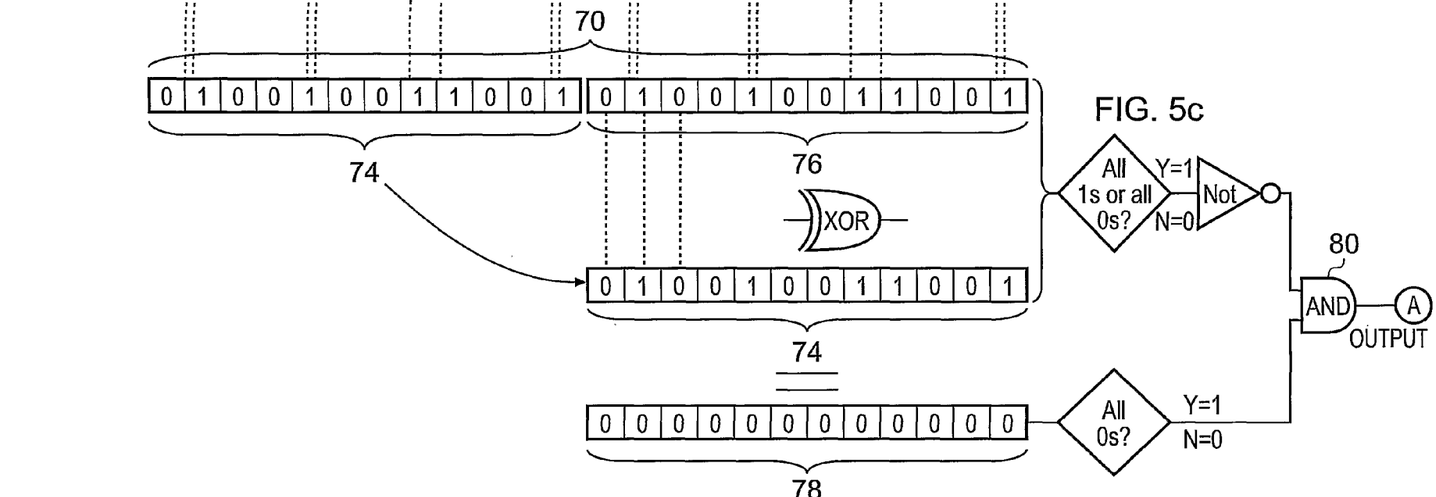

The recordings of the first PIC microcontroller are entered into a first 24 bit register 70 shown in FIG. 5c in a scrolling manner, new data constantly displacing the old data by one place. Likewise, the recordings of the second PIC microcontroller are entered into a second 24 bit register 72 shown in FIG. 5f in a scrolling manner, new data constantly displacing the old data by one place.

In the embodiment described, there are two PIC microcontrollers, but as will be understood to a person of ordinary skill in the art, the same methods and techniques can be applied to any number of sub-processing units. For example, the PIC microcontroller unit 68 can comprise at least three PIC microcontrollers.

The 24 bit register 70 of FIG. 5c shows recordings of the first PIC microcontroller for two revolutions of the tool 30 which corresponds to the signals shown in FIGS. 5a and 5b. For purposes of illustration, the 24 bit register 70 is divided into two 12 bit registers, first sub-register 74 and second sub-register 76. The first sub-register 74 represents data which was recorded during the revolution of the tool 30 prior to the revolution of the tool 30 recorded the second sub-register 76. The data in first sub-register 74 has been displaced from second sub-register 76.

The entries in the first 74 and second 76 sub-registers are exclusively ORed as shown to get the first resultant register 78. The first resultant register 78 will only be all 0s when the data in the first sub-register 74 and the second sub-register 76 match, which in turn will match only when they have the same pattern of data.

First 74 and second 76 sub-registers will have the same pattern of data when a rotating tool or the like reflects light onto the photodiode 18 at the same point in time during each revolution of the tool. Thus, in the embodiment described, the first resultant register 78 will contain all 0s when the tool is rotating at 200 rpm.

Additionally the first resultant register 78 will contain all 0s when the first 74 and second 76 sub-registers contain all 1s or all 0s. This is possible when no tool is present, when light beam 52 is constantly reflected onto the photodiode 18, or when excessive light reaches the photodiode 18. To prevent any of the above events causing the tool detector to false trigger, logic is used. If first 74 and second 76 sub-registers contain all 1s or all 0s then a logical 0 is entered at first AND gate 80. Only when first 74 and second 76 sub-registers are not all 1s or not all 0s, and first resultant register 78 is all 0s does the first AND gate trigger an output.

The comparison of the first 74 and second 76 sub-registers can occur once the tool has been held in the transmitted light path 52 long enough for both of the registers to be filled with data representative of the signal received at photodiode 18. In the embodiment described, subsequent comparisons occur only once the content of the second sub-register 76 has been replaced with new data from a further full revolution of the tool. However, subsequent comparisons can occur more (or less) frequently. For instance, subsequent comparisons can occur every time a new data entry is added to the first register 70.

Figure 5D:
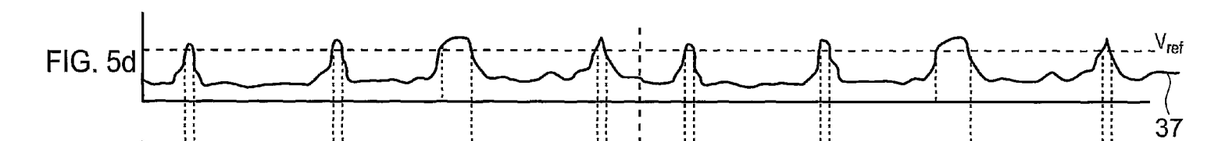
Figure 5E:
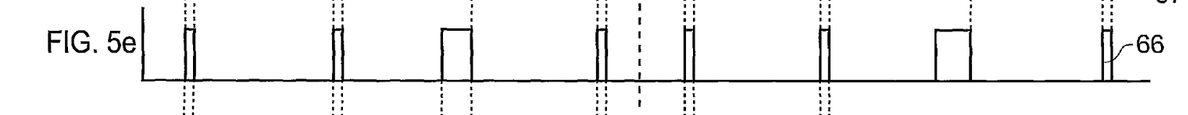
Figures 5F, 5G:
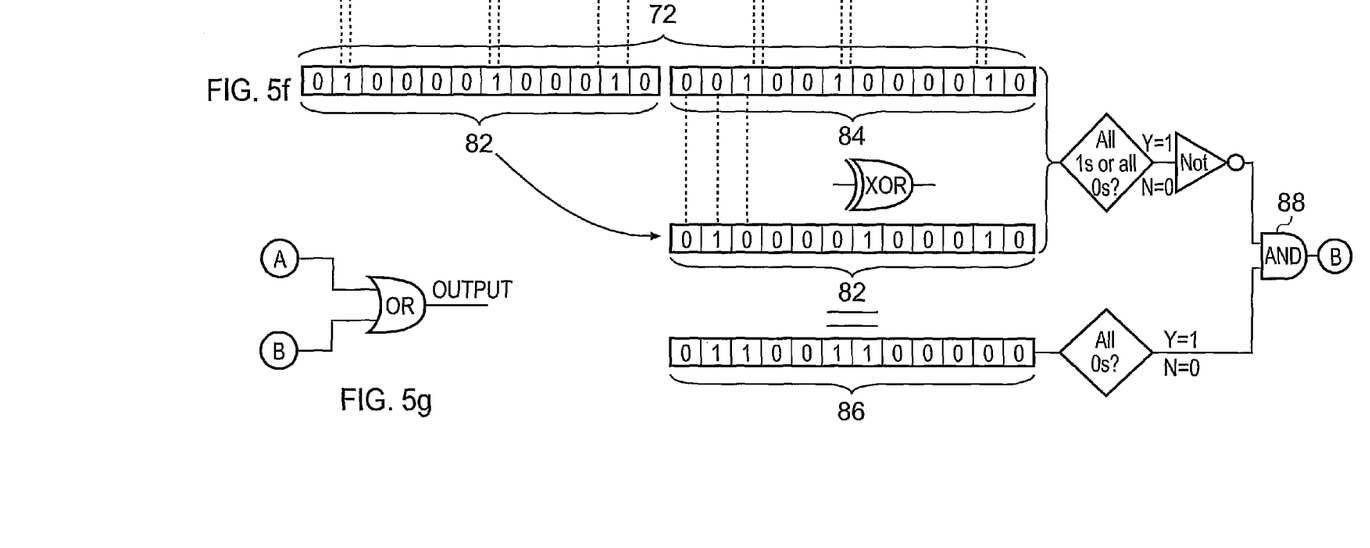

The 24 bit register 72 of FIG. 5f shows recordings of the second PIC microcontroller for approximately one and a half revolutions of the tool 30 which corresponds to the signals shown in FIGS. 5d and 5e. The signals shown in FIGS. 5d and 5e are exactly the same signals as shown in FIGS. 5a and 5b, taken at the same time, but have been duplicated in the Figures for ease of illustration. Also for purposes of illustration, the 24 bit register 72 is divided into two 12 bit registers: third sub-register 82 and fourth sub-register 84. The third sub-register 82 represents data which was recorded prior to data recorded in the fourth sub-register 84. The data in third sub-register 82 has been displaced from fourth sub-register 84.

The entries in the third 82 and fourth 84 sub-registers are exclusively ORed as shown to get the second resultant register 86. The second resultant register 86 will only be all 0s when the data in the third sub-register 82 and the fourth sub-register 84 match, which in turn will match only when they have the same pattern of data.

In the embodiment shown, the sampling rate of the second PIC microcontroller is configured to detect tools rotating 300 rpm, not at 200 rpm which in this example is the rotational speed of the tool 30 reflecting the signal 54. Accordingly, as can be seen, the sampling period is too short and so the third register 82 becomes full, and the fourth register 84 is started to be filled, before the tool has completed one full revolution. Accordingly, as shown in FIG. 5f, the third 82 and fourth 84 registers will contain different patterns of data and the second resultant register 86 will not contain all 0s. There will therefore be no output from the second AND gate 88.

As with the first resultant register 78, the second resultant register 86 will contain all 0s when the third 82 and fourth 84 sub-registers contain all 1s or all 0s. Accordingly, logic is used to prevent such a situation from outputting a false signal. If third 82 and fourth 84 sub-registers contain all 1s or all 0s then a logical 0 is entered at second AND gate 88. Only when third 82 and fourth 84 sub-registers are not all 1s or not all 0s, and second resultant register 86 is all 0s does the second AND gate 88 trigger an output.

The first PIC microcontroller and second PIC microcontroller operate in parallel. As illustrated in FIG. 5g, the outputs A and B from the first 80 and second 88 AND gates are ORed to get an object detected output signal. Accordingly, it is only necessary for one of the first PIC microcontroller and the second PIC microcontroller to successfully detect a tool in order for the analyser circuitry 20 to output an objected detected output signal.

As will be understood, the second PIC microcontroller will detect a tool, and the second AND gate 88 will output a signal, when the period of rotation of the tool 30 is the same as the period of time it takes to fill one 12 bit register in the second sub-processor. Accordingly, in this embodiment, the second PIC microcontroller will detect a tool that is rotating at 300 rpm (i.e. which has a period of rotation equal to twelve 16.6 mS samples).

It can be seen from the foregoing that a rotating object having features which cause a variation in the signal received by the photodiode 18 is required to produce an output from the analyser circuitry 20.

In an alternative embodiment, the contents of the first 74 and third 82 sub-registers can contain previously recorded data which has been selected or downloaded from a historical data source. In this embodiment, the sub-registers are compared in the manner previously described.

In embodiments in which the PIC microcontroller unit 68 comprises one PIC microcontroller only, the PIC microcontroller unit 68 operates in the exact same way as described above in relation to FIGS. 5a to 5c and as described in relation to FIGS. 5d to 5f. However, rather than being able to analyse a signal from the signal comparator 58 according to two different sampling parameters in parallel, the PIC microcontroller unit 68 can only analyse a signal from the signal comparator 58 according to one set of sampling parameters at any one time.

The PIC microcontroller unit 68 can be initially setup to detect a tool rotating at a first rotational speed, such as 200 rpm. In this case the sampling parameters would be to sample the signal from the signal comparator 58 into 12 bit registers, wherein the sampling period is 25 mS. The PIC microcontroller unit 68 can then subsequently be setup with different sampling parameters to detect a tool rotating at a different rotational speed, such as 300 rpm. This can be done, for instance, by the machine tool controller 50 determining and inputting the rotational speed of the object to the PIC microcontroller unit 68 via input line 90. The PIC microcontroller unit 68 can then determine the sampling parameters to use. In this case the sampling parameters would sample the signal from the signal comparator 58 into 12 bit registers, wherein the sampling period is 16.6 mS.

Likewise, the input line 90 can be used to configure the sampling parameters used by one or more of the plurality of PIC microcontrollers in embodiments in which the PIC microcontroller unit 68 comprises a plurality of PIC microcontrollers.

As will be understood, the input line 90 need not necessarily be connected to the machine tool controller, but could be connected to an input device by which the user can input the rotational speed of the object or input directly the sampling parameters to use. Furthermore, the input line 90 could be connected to a switch or other device which enables the PIC microcontroller to operate in a feedback mode in which it can determine the rotational speed of the tool, and subsequently calculate the appropriate sampling parameters to use. If the number of reflective features on the object being detected is known, for instance if the number of reflective flutes on a tool is known, then the PIC microcontroller could be configured to determine the rotational speed of the tool by analyzing the light reflected by the tool itself. Otherwise, in an alternative example, a master tool could be loaded into the chuck of the machined tool. The master tool could, for instance, have a single reflective marker which reflects light transmitted by the laser 12 onto the photodiode 18 once every revolution. Furthermore, a reflective marker could be provided on the rotating part of the machine tool itself. Accordingly, by determining the frequency of the reflected light, it is possible to determine the rotational speed of objects rotated by the machine tool. As will be understood, the marker need not be reflective. The marker could, for instance, be an LED or other optical source which configured to transmit an optical signal detectable by the photodiode 18.

When droplets of machine coolant saturate the environment adjacent the tool detector it is possible for these droplets to cause false triggering of the tool found signal. To reduce false triggers the correlation of data can be carried out over more than two revolutions. This will be explained in connection with FIG. 6.

Figure 6:
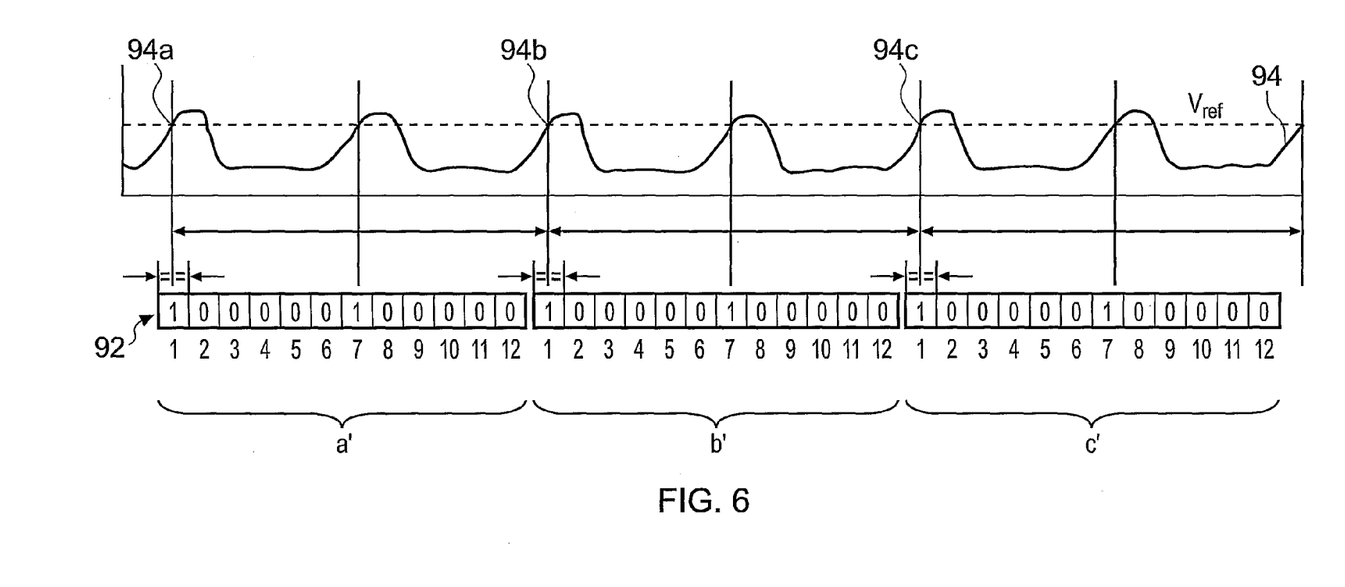
FIG. 6 shows a diagrammatic representation of an alternative operation of the circuitry shown in FIG. 4.

In FIG. 6 matching patterns of data are sought over three (a, b and c) revolutions of the tool. Logic circuits are used as shown in FIGS. 5c and 5f to produce a tool found signal if correlating data is found in the three parts a', b' and c' of the data in a 36 bit register 92 i.e. matching 1s or 0s. More than three revolutions could be used. The determination of correlation data is made once every revolution.

In the method illustrated in FIG. 6 twelve samples per revolution are used, i.e. one every 5 mS. A two-tooth tool (such as a drill bit) is being detected which is rotating at approximately 1000 rpm. When analogue signal 94 rises above a threshold Vref, a binary 1 is inserted into the current position of register 92. As before, the register is scrolling the new data pushing out the oldest data. When a first signal 94a is received the internal clock is reset so that the middle of the sample occurs at the receipt of signal 94a i.e. the next sample starts 2.5 mS later (and ends 7.5 ms later).

Such an adjustment occurs when no signal has been received for 60 mS (1 rev) in this instance, and then every signal 94b,c which occurs after the twelfth sample is taken, until no data is collected for 60 mS.

Thus, if a tooth is coming round again but the tool is not rotating at exactly 1000 rpm, then the tooth and the tool detector will be resynchronised at every revolution. This means the pattern of data which occurs due to the reflections of the teeth will not drift across the register positions 1 to 12 from one revolution to another, but will remain in the same register position during each revolution due to the resynchronisation of the clock with the tool at each revolution. Thus an increased number of revolutions can then be used to detect the tool which reduces the occurrence of false triggers or undetected tools.

Figure 7:
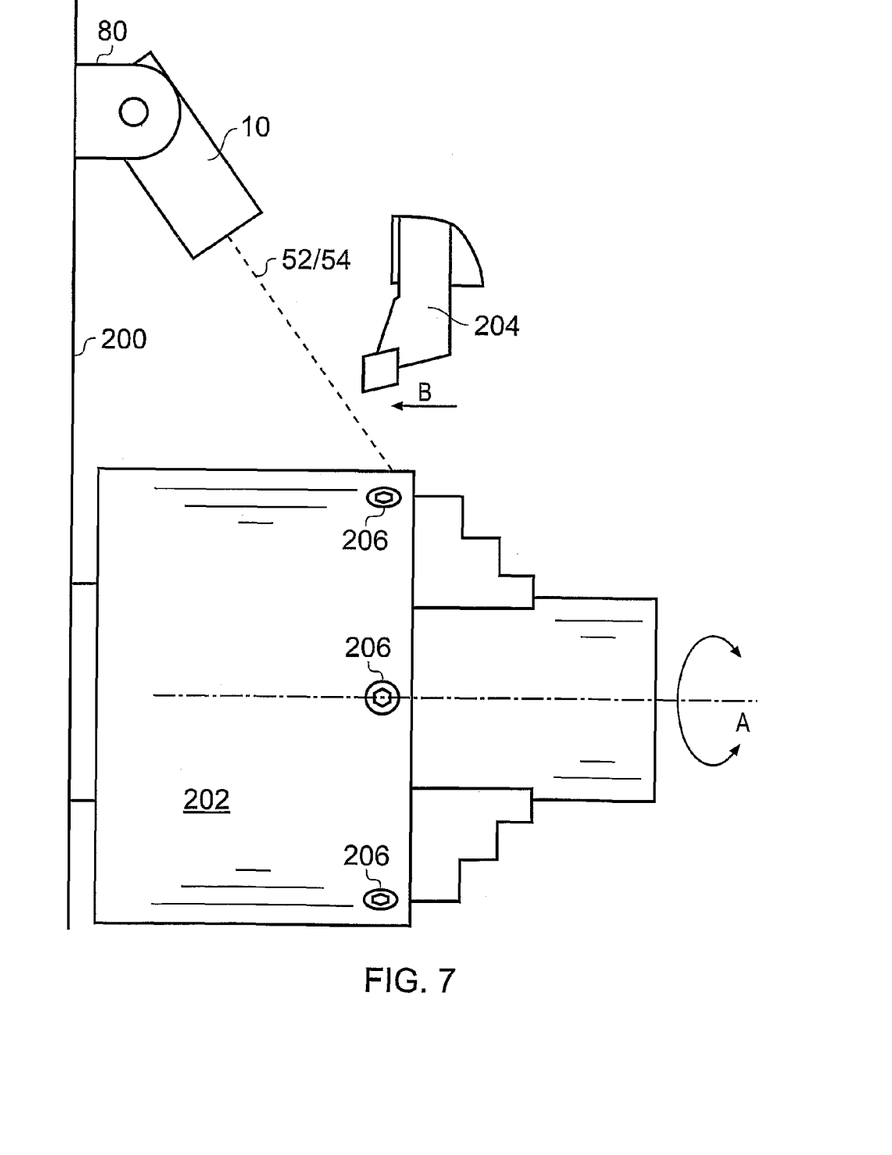
FIG. 7 illustrates an alternative use of the present invention.

Not all machine tools have rotating tools. Lathes generally have non-rotatable tools and a workholding chuck which rotates. FIG. 7 shows an embodiment of the invention for use with lathes and the like where the cutting tool does not rotate, but an object which causes a sample on which the tool will work does rotate. Detector 10 is shown in plan view, fixed to the headstock 200, via a mounting 80, on the lathe and directed toward lathe chuck 202. Lathe chuck 202 rotates in the direction of arrow A. As described above, reflective features 206 on the chuck will produce an output signal from the analyser circuitry 20 in the detector 10 when the chuck rotates. However, when the cutting tool 204 is brought into the beam 52 or 54 then the output signal will stop. Consequently the presence or absence of the cutting tool 204 can be determined from the state of the output signal from the analyser circuitry 20. Greater accuracy can be obtained if the light beam 52 is focused to the point where a lathe tool is expected to enter that beam.

In this embodiment, rather than the tool providing the pattern when it interacts with the beam thus the production of the pattern means that the tool is present, it is the inverse situation. It is the absence of the pattern produced by the chuck which is indicative of a tool being present. In either case, a change in the data stream either producing the pattern or obscuring the pattern indicates that a tool is present.

Furthermore, the invention can be used to detect a non-rotating object. For instance, it is possible to detect an object which oscillates at a constant frequency, such as an object which is dipped into and out of the light path 52. The amount of light detected by the photodetector 18 will peak regularly as the object moves into the light path 52 and cause reflections 54 which are detected by the photodiode 18.

As an example, a non-rotating object can be oscillating at 1 Hz, so that the object is dipped into the light path 52 once every second. With reference to FIG. 6, the signal 94 can represent the signal received by the photodiode 18. The peaks in signal 94 represent the presence of the object being dipped into the transmitted light path 52 so as to reflect the light back along light path 54, and the troughs represent the absence of the object from the light path 52.

In the embodiment described, the PIC microcontroller is set up to detect an object oscillating at 1 Hz. In particular, the PIC microcontroller is set up to sample the signal 94 approximately one every 166 mS so that six samples are taken for every oscillation of the object. Furthermore, each register is 12 bits long so that two full oscillations are recorded in each register, a', b' and c'. As the PIC microcontroller is correctly set up to detect the object oscillating at 1 Hz, each a', b' and c' will contain binary "1"s at the same place in their register. Accordingly, the comparison of these three registers using the methods described above will lead to a determination of an object being present. If the PIC microcontroller was set up to detect an object oscillating at a different frequency, such as one oscillating at 3 Hz, then the binary "1" will located at different positions in each of the three registers, leading to the non-detection of the object.

In the embodiments described so far, light which has been reflected off an object, such as a tool or a chuck is directed to the receiver. In an alternative example, light which is emitted from the object can be directed to the receiver. For example, the object can be provided with LEDs.

Software in the machine tool controller 50 can be used to inform the machine cutting program to carry on the machining process when a tool has been detected (either a rotating tool or a non-rotating lathe type tool).

Many variants which fall within the ambit of the invention will be readily apparent to the skilled addressee. For example, the detection of objects other than tools is possible provided the object to be detected or some part near the object is moving.

Laser light has been described however, any visible or non-visible light may be provided from any source including ambient light. A binary register of up to 36 bits has been described but other sizes are possible and binary data need not be used.

In an enhancement to the above, a unit can be provided to send a signal which corresponds to the light which would be reflected from a tool. Thus, the tool detector can be installed and checked on a machine tool without the need to bring a tool adjacent the detector. The unit could comprise a simple rotating mirror or other reflective surface, but is preferably a solid state arrangement which produces a pulse of laser light in response to a similar pulse sent by the tool detector.

The invention claimed is:

1. An object detector apparatus, comprising:
    a receiver configured to receive a signal from an object having a repetitive motion, the signal repeating at a frequency that is dependent on the frequency of the repetitive motion of the object; and
    an analyser configured to sample a signal from the object received by the receiver according to a first set of sampling parameters into a first sampled data set, and to produce an output based on a comparison of the first sampled data set with at least one previously sampled data set;
    wherein the analyser is configured to sample a signal from the same object received by the receiver using a second set of sampling parameters which differs from the first set of sampling parameters into a second sampled data set, and to produce an output based on a comparison of the second sampled data set with at least one previously sampled data set, and
    the output based on the comparison of the first sampled data set with the at least one previously sampled data set, and the output based on the comparison of the second sampled data set with the at least one previously sampled data set, are used in determining whether the object has been detected.

2. An object detector apparatus as claimed in claim 1, in which the signal sampled into the first sampled data set, is the same signal as the signal sampled into the second sampled data set.

3. An object detector apparatus as claimed in claim 2, in which the analyser is operable to sample the signal into the first sampled data set and to sample the signal into the second sampled data set substantially concurrently.

4. An object detector apparatus as claimed in claim 2, further comprising first circuitry configured to sample the signal into the first sampled data set, and second circuitry configured operate in parallel with the first circuitry to sample the signal into the second sampled data set.

5. An object detector apparatus as claimed in claim 4, in which the first circuitry is configured to compare the first sampled data set with the first previously sampled data set and produce an output signal indicative of whether an object has been detected based on the comparison, and in which the second circuitry is configured to compare the second sampled data set with the second previously sampled data set and to produce an output signal indicative of whether an object has been detected based on the comparison.

6. An object detector apparatus as claimed in claim 5, in which an object detected signal is output when either or both of the first and second processors output a signal indicative of an object being detected.

7. An object detector apparatus as claimed in claim 1, in which the signal sampled into the second sampled data set is a different signal to the signal that is sampled into the first data set.

8. An object detector apparatus as claimed in claim 7, in which the signal sampled into the second sampled data set is a signal received by the receiver subsequent to the signal that is sampled into the first data set.

9. An object detector apparatus as claimed in claim 8, further comprising circuitry which is configured to sample the signal into the first sampled data set and to subsequently sample the signal into the second sampled data set.

10. An object detector apparatus as claimed in claim 1, further comprising an input mechanism by which the sampling parameters used by the analyzer can be changed.

11. An object detector apparatus as claimed in claim 10, in which the input mechanism comprises a feedback device which is operable to determine the frequency of the repetitive motion of the object and to change the first and/or second sampling parameters used by the analyser based on the determined frequency of repetitive motion.

12. An object detector apparatus as claimed in claim 1, in which the analyser is operable to sample a signal received by the receiver using at least a third set of sampling parameters which differs to the first and second sets of sampling parameters into at least a third sampled data set, and to output an object detected signal based on a comparison of the third sampled data set with a previously sampled data set.

13. An object detector apparatus as claimed in claim 1, in which the sampling parameters comprise a sampling rate.

14. An object detector apparatus as claimed in claim 1, in which the sampling parameters comprise the number of previously sampled data sets the first and second sampled signals are compared with.

15. An object detector apparatus as claimed in claim 1, in which the sampled data sets comprise binary data.

16. An object detector apparatus as claimed in claim 1, in which the receiver is configured to receive an optical signal from an object.

17. An object detector apparatus as claimed in claim 1, further comprising a transmitter configured to transmit a signal, the signal received by the receiver being at least a partial reflection of the transmitted signal.

18. An object detector apparatus as claimed in claim 1 in which the object to be detected is a cutting tool.

19. An object detector apparatus as claimed in claim 1, in which the repetitive motion is rotational.

20. An object detector apparatus, comprising:
a receiver configured to receive a signal from an object having a repetitive motion, the signal repeating at a frequency that is dependent on the frequency of the repetitive motion of the object; and
an analyser coupled to the receiver, the analyser configured to sample the signal according to a first set of sampling parameters into a first sampled data set, and to produce a first output signal based on a comparison of the first sampled data set with at least one previously sampled data set, and to concurrently sample the signal using a second set of sampling parameters which differs from the first set of sampling parameters into a second sampled data set, and to produce a second output signal based on a comparison of the second sampled data set with at least one previously sampled data set,
wherein the first output signal and the second output signal are used in determining whether the object has been detected.

21. An object detector apparatus, comprising:
a receiver configured to receive a signal from an object having a repetitive motion, the signal repeating at a frequency that is dependent on the frequency of the repetitive motion of the object; and
an analyser coupled to the receiver, the analyser configured to sample a first signal from the object received by the receiver according to a first set of sampling parameters and to produce a first output signal based on a comparison of the first sampled data set with at least one previously sampled data set, and the analyser is configured to subsequently sample a second signal from the same object received by the receiver subsequent to the first signal according to a second set of sampling parameters which differ from the first set of sampling parameters, and to produce a second output signal based on a comparison of the second sampled data set with at least one previously sampled data set,
wherein the first output signal and the second output signal are used in determining whether the object has been detected.

22. A method of detecting the presence of an object, the method comprising:
(i) receiving a signal from an object having a repetitive motion, the signal repeating at a frequency that is dependent on the frequency of the repetitive motion of the object;
(ii) sampling the signal received from the object according to a first set of sampling parameters into a first sampled data set, and producing an output signal based on a comparison of the first sampled data set with a first previously sampled data set; and
(iii) sampling the signal received from the same object according to a second set of sampling parameters, which differ from the first set of sampling parameters, into a second sampled data set, and producing an output signal based on a comparison of the second sampled data set with a second previously sampled data set,
wherein the output signal based on the comparison of the first sampled data set with the first previously sampled data set, and the output signal based on the comparison of the second sampled data set with the second previously sampled data set, are used in determining whether the object has been detected.

23. A method as claimed in claim 22, in which the signal sampled into the first sampled data set is the same signal as the signal sampled into the second sampled data set.

24. A method as claimed in claim 23, in which the sampling of the received signal according to the second set of sampling parameters occurs substantially concurrently with the sampling of the received signal according to the first set of sampling parameters.

25. A method as claimed in claim 23, in which the signal sampled into the second sampled data set is a signal received by the receiver subsequent to the signal that is sampled into the first data set.

26. A method as claimed in claim 25, in which the method further comprises subsequent to step (i) and prior to step (ii), inputting the second set of sampling parameters and reconfiguring the analyser to use the second set of sampling parameters.

* * * * *